US006851042B1

(12) United States Patent
Murray

(10) Patent No.: US 6,851,042 B1
(45) Date of Patent: *Feb. 1, 2005

(54) AUDIO, FAX AND MODEM CAPABILITIES WITH A DIGITAL SIGNAL PROCESSOR OF A SOUND CARD OF A COMPUTER SYSTEM

(75) Inventor: David E. Murray, Tomball, TX (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 693 days.

(21) Appl. No.: 08/949,534

(22) Filed: Oct. 14, 1997

Related U.S. Application Data

(63) Continuation of application No. 08/404,942, filed on Mar. 15, 1995, now abandoned, which is a continuation of application No. 08/094,491, filed on Jul. 19, 1993, now abandoned.

(51) Int. Cl.[7] .............................................. G06F 15/00
(52) U.S. Cl. ...................................................... 712/32
(58) Field of Search .......................................... 712/32

(56) References Cited

U.S. PATENT DOCUMENTS

| | | | | |
|---|---|---|---|---|
| 4,788,717 A | * | 11/1988 | Blanchard et al. ............. 379/98 |
| 4,847,863 A | * | 7/1989 | Watson ............................ 375/8 |
| 4,910,729 A | * | 3/1990 | Coffelt et al. .................. 370/17 |
| 4,942,550 A | * | 7/1990 | Murray ........................ 395/275 |
| 4,991,169 A | * | 2/1991 | Davis et al. ................... 370/77 |
| 5,196,943 A | * | 3/1993 | Hersee et al. ................ 358/403 |
| 5,200,981 A | * | 4/1993 | Carmon ....................... 375/106 |
| 5,250,940 A | * | 10/1993 | Valentaten et al. .......... 345/189 |
| 5,272,598 A | * | 12/1993 | Kobayashi et al. .......... 361/708 |
| 5,274,765 A | * | 12/1993 | Le Gallo ..................... 395/275 |
| 5,331,111 A | * | 7/1994 | O'Connell .................... 84/602 |
| 5,687,222 A | * | 11/1997 | McLaughlin et al. ......... 379/97 |
| 5,748,468 A | * | 5/1998 | Notenboom et al. ............ 700/3 |
| 5,799,068 A | * | 8/1998 | Kikinis et al. ............ 379/93.06 |
| 5,818,127 A | * | 10/1998 | Abraham ...................... 307/106 |
| 6,021,452 A | * | 2/2000 | Birch et al. .................. 710/129 |
| 6,088,620 A | * | 7/2000 | Ninomiya et al. ............. 700/16 |

OTHER PUBLICATIONS

"TI–Speech, a comprehensive system of hardware, software, and applications tools incorporates techniques that make it reliable, versatile and extendable." George Martin and Roy Pursley. Speech Technology, vol. 3, No. 1, Aug./Sep. 1985, New York, NY USA pp. 86–88, 91.
G. Martin and R. Pursley, "TI–Speech", Speech Technology, vol. 3, No. 1, Aug. 1985, pp. 86–88.
M. Readinger and D. Candy, "Voice I/O Improves Productivity . . . ", Instruments and Control Systems, vol. 58, No. 8, 7/85, pp. 53–56.
Electronic Engineering, "New Board Provides Voice I/O for Pcs'" vol. 56, No. 690, 6/84, p. 19.
Disclosed anonymously, "Personal Computer Feature Card Secondary Bus", Research Disclosure, N. 34108, 9/92, No. XP320019.
AT&T Microelectronics, DSP3210 Digitial Signal Processor, The Multimedia Solution, 9/91, pp. 3–1—3–14.

* cited by examiner

Primary Examiner—David Y Eng

(57) ABSTRACT

An optional card including a digital signal processor (DSP) for use by a modem daughter board, where the modem daughter board is equipped with a data access arrangement (DAA) for upgrading a computer system to include modem and facsimile capabilities. The optional card may preferably be a sound board including a DSP and bus controller for interfacing with the I/O bus of the computer system, and a coder-decoder (CODEC) and connector for receiving and interfacing the daughter board modem to the DSP. In an alternative embodiment, the DSP is provided on the system board coupled to the host bus or the I/O bus of the computer system, and the modem functions, including a CODEC and DAA, are provided on an optional modem card. The CODEC includes logic for transferring digitized analog data to main memory as controlled by the CPU of the computer system. Modem software is provided to control communications and transfer of data in any of the embodiments.

18 Claims, 3 Drawing Sheets

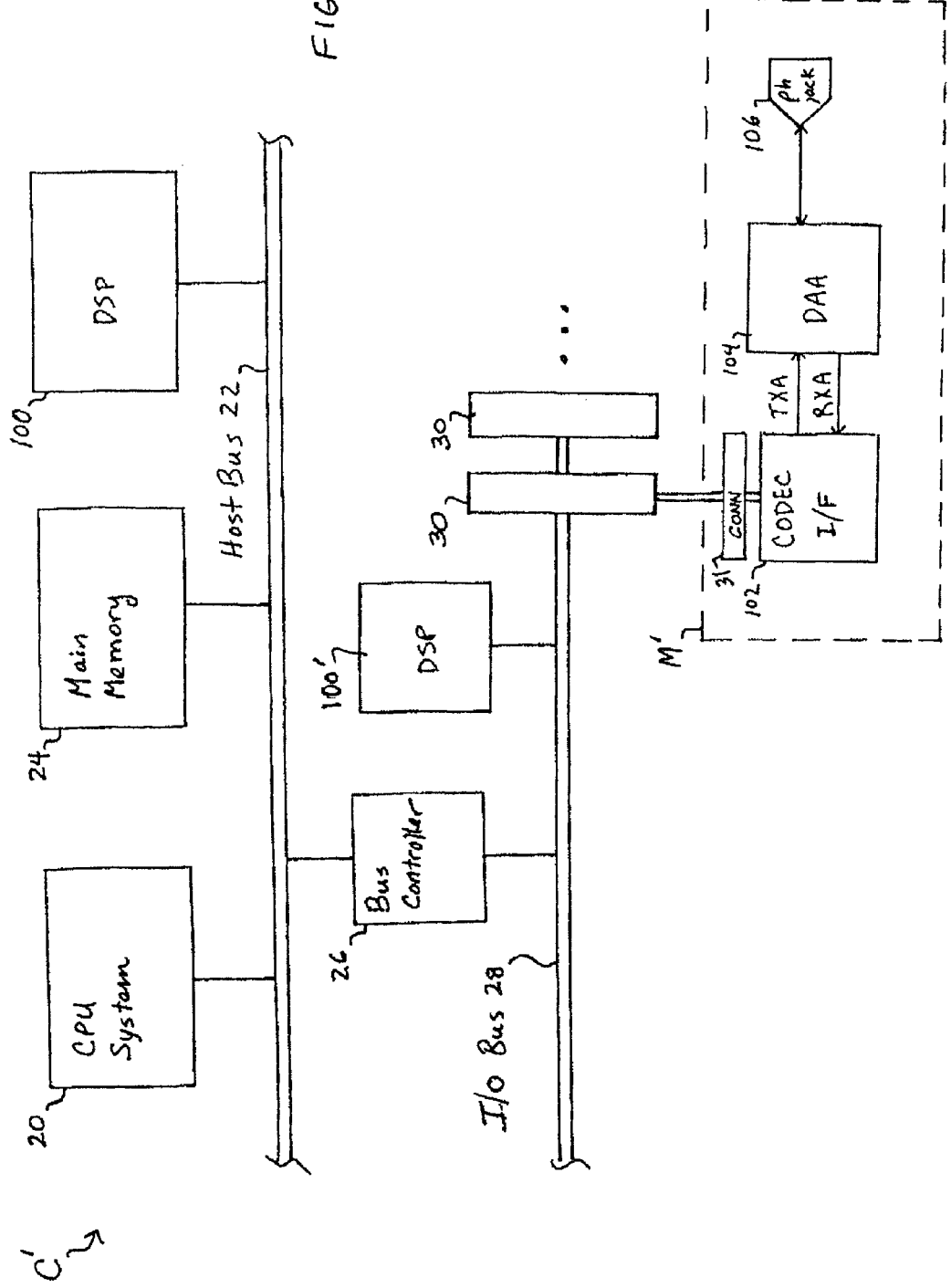

AUDIO, FAX AND MODEM CAPABILITIES WITH A DIGITAL SIGNAL PROCESSOR OF A SOUND CARD OF A COMPUTER SYSTEM

This is a continuation of co-pending application Ser. No. 08/404,942 filed on Mar. 15, 1995 now abandoned.

This is a continuation of co-pending application Ser. No. 08/094,491 filed on Jul. 19, 1993 now abandoned.

BACKGROUND OF THE INVENTION

1. Field of the Invention

The present invention relates to an apparatus for upgrading a computer system equipped with a digital signal processor to include modem and facsimile functions.

2. Description of the Related Art

Computer systems are generally designed to include an input/output (I/O) bus coupled to one or more connectors or slots to allow the computer system to be upgraded by adding optional capabilities. The optional capabilities or functions are typically incorporated onto a separate printed circuit board or option card. The option card includes a connector which plugs into a slot on the I/O bus to electrically couple the circuitry on the option card to the computer system. One such optional function is a sound board, such as the Soundblaster by Creative Labs, Inc., while another is a modem or fax/modem board. The Soundblaster option includes audio processing capability for interfacing the computer to a variety of peripherals and functions, such as a joystick and stereo sound for computer games, musical synthesis and a CD ROM.

At the heart of the sound board is often a powerful numeric processor, such as a digital signal processor (DSP), which can perform frequency modulation synthesis for the various functions of the sound board. The DSP typically performs signal processing used for a variety of multimedia applications, such as electronic data processing, high precision servo control, graphics various capabilities for work stations, robotics, image processing, process control, real time simulation and instrumentation, speech recognition and synthesis, and telecommunication capabilities such as PBX, modems and facsimiles (faxes). For purposes of simplification, modem functions discussed hereinafter are assumed to include the capability to handle fax information, since the communication protocol is similar.

High speed modem systems are also typically incorporated onto an option card and usually include a "data pump" for supporting the various protocols of modem communication, such as the V.22, V.22bis, V.32 and V.32bis protocols recommended by the International Telegraph and Telephone Consultative Committee (CCITT). The data pump itself typically includes a DSP for performing modulation, demodulation and echo cancellation and a coder-decoder (CODEC) for performing analog to digital (A/D) and digital to analog (D/A) conversion. Analog signals from the phone line are digitized by the CODEC, and then demodulated by the DSP to extract the original digital data sent by an external device. This procedure is reversed for data transmitted by the modem to the external device.

The data pump is coupled to the phone line through a data access arrangement (DAA), which electrically isolates the modem from the phone line to control emissions of electromagnetic interference/radio frequency interference (EMI/RFI) as required by the Federal Communications Commission (FCC). The DAA also typically isolates the received from the transmitted analog signals, and develops a digital ring signal to inform the computer system to answer. The DAA receives signals from the phone line through a telephone jack, such as an RJ11C used for standard telephones. Other support logic is typically included to interface the modem to the computer system, such as a microcontroller for establishing a communications link, controlling the sequence of events to originate or answer a call, and to transmit or receive digital data from the computer system through a universal asynchronous receiver transmitter (UART) across the I/O bus. The microcontroller also typically performs error correction procedures, such as according to the V.42 protocol recommended by the CCITT, as well as compression/decompression procedures, such as according to the V.42bis protocol recommended by the CCITT.

A significant disadvantage of the prior art option cards requiring complex numeric operations offered for computer systems is that a user must pay for multiple DSPs, one for each additional option. An integrated card incorporating multiple functions including a modem might appear to be desirable, but there are several disadvantages. First, even though only a single DSP would be required, a combination card would be more expensive than the cards in present use. Those persons requiring only audio functions would be forced to purchase the modem components, defeating the purpose of saving cost.

Furthermore, an integrated modem raises problems when shipping to foreign countries, such as Germany. An extensive qualification process is required for any modem shipped to a foreign country, which usually takes about six months to complete. The qualification process must be performed for any electrical device attachable to phone lines, such as modems, and includes anything electrically integrated to the modem. The qualification process must be performed again if any changes are made, including non-modem changes, to a device attached to the phone lines. Those persons in foreign countries only needing audio functions but forced to purchase an integrated modem would also be forced to wait until the qualification process was complete to use the new functions, even if they do not intend to use the modem.

It is therefore desirable to provide an optional modem apparatus to upgrade a computer system to include modem capability using a DSP already provided in the computer system or on an option card.

SUMMARY OF THE PRESENT INVENTION

In one embodiment according to the present invention, an option card for installation into a computer system includes a DSP, a CODEC and a daughter board connector for receiving an optional daughter board. The option card includes the DSP for performing the capabilities associated with a first function or set of functions, such as audio functions. For example, the option card is preferably a sound board, where the DSP performs audio processing, such as frequency modulation synthesis, for the various functions on the sound board. The optional daughter board is connected to the option card to add the capabilities associated with a second function or set of functions not necessarily related to the first set of functions. For example, the daughter board could be a partial modem board including a DAA and a phone jack to perform modem and facsimile functions. In this case, the DSP preferably includes the capability to perform the error correction and compression/decompression process typically performed by a microcontroller in a modem system. Once the daughter board is added, the single DSP has a dual role for performing the capabilities associated with two separate functions or sets of functions.

The option card also preferably includes a bus controller for coupling to the I/O bus for converting data from serial to parallel, and vice versa, and for transferring data between the sound board and the computer system. The bus controller disclosed herein is used generically and preferably includes control and data transfer functions, whereas data transfer capabilities would normally be performed through separate buffers and/or transceivers. The daughter board preferably includes a CODEC, a DAA and a phone jack to upgrade the computer system to include modem and fax capabilities when installed, where the DAA is preferably compatible with the public switched telephone network (PSTN) interface.

A driver routine or software program used for controlling the operations associated with the daughter board is provided either on a read only memory (ROM) incorporated on the option card, or may preferably be downloaded to the card and stored in random access memory (RAM) incorporated on the option card. For example, modem software could be downloaded into a RAM chip located on the option card for access by the DSP. The RAM option is preferable since the RAM is normally already present to hold software for the various other functions on the option card. Thus, a sound board with an optional modem daughter board installed performs both audio and modem functions using a single DSP. Foreign qualification procedures would only be required if and when the daughter board modem is purchased.

In another embodiment according to the present invention, the DSP processor is provided on the system board and preferably coupled to the host bus for interfacing with the central processing unit (CPU) system and main memory. Alternatively, the DSP is provided on the system board but coupled to the I/O bus rather than the host bus. In either case, operation is similar. An option card, such as a modem card including the DAA and CODEC logic, is provided for connection to the I/O slot. Software is loaded into main memory for controlling the modem and fax functions. The CODEC logic in this embodiment includes logic for transferring its data across the I/O bus as controlled by the CPU executing modem software. The data transferred to and stored in memory is the "raw" digitized analog signals converted by the CODEC, which has yet to be demodulated and otherwise processed by the DSP.

The processing by the DSP is required to retrieve the original data sent by the external device. The modem software informs the DSP that the data has been received from an external device so that the DSP can then process the data. The DSP retrieves the raw data from the memory and provides the redeveloped original data to the memory as an output. For data to be transmitted by the modem, the DSP modulates the digital data by retrieving original data from the memory and returning modulated data to the memory and informs the host CPU, and the host CPU transfers the modulated data from the memory to the CBDEC on the modem. It is noted that the microcontroller and UART, typically required on standard modems, are not necessary.

In either of the preferred embodiments, it is appreciated that a single DSP processor is used for multiple functions including the modem and fax capabilities. Furthermore, the international qualification process need only be performed for the modem card or daughter board.

BRIEF DESCRIPTION OF THE DRAWINGS

A better understanding of the present invention can be obtained when the following detailed description of the preferred embodiment is considered in conjunction with the following drawings, in which:

FIG. 3 is a computer system according to an alternative embodiment of the present invention, incorporating a DSP with audio capabilities on the system board.

DETAILED DESCRIPTION OF THE PREFERRED EMBODIMENT

Figure 1:
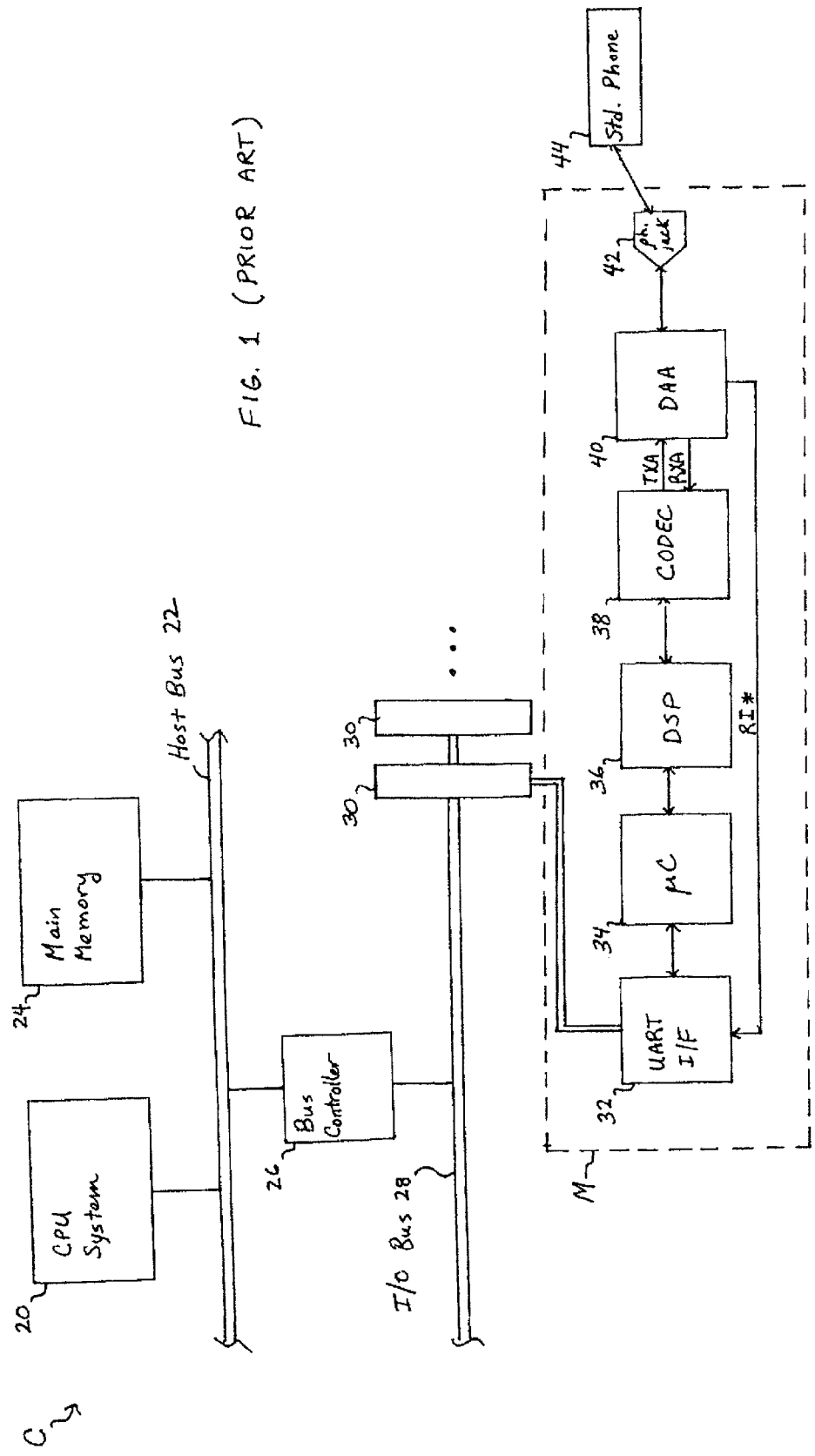
FIG. 1 is a simplified block diagram of a computer system with an optional modem card according to prior art installed in a slot on the I/O bus.

Referring now to FIG. 1, a simplified block diagram of a high speed modem M according to prior art is shown coupled through an I/O bus 28 of a computer system C. The computer system C includes a central processing unit (CPU) system 20 coupled to a host bus 22 for interfacing the CPU system 20 to a memory array, otherwise referred to as the main memory 24. The host bus 22 is coupled to the I/O bus 28 through a bus controller 26, which is preferably compatible with the Industry Standard Architecture (ISA) or the Extended ISA (EISA) bus. The bus controller 26 allows the CPU system 20 to control input/output (I/O) operations on the I/O bus 28. This includes transferring data between modem M and the computer system C as directed by appropriate modem software loaded into the main memory 24. The bus controller 26 includes control and data transfer capabilities, where data transfer would typically occur through separate buffers and/or transceivers as known to those skilled in the art. In the preferred embodiment, the host computer system C is compatible with the IBM PC/AT architecture, although other types of computer systems are contemplated. Many other functional blocks and much of the control and support logic associated with each of the included components are not shown for purposes of simplification.

The I/O bus 28 preferably includes a plurality of connectors or slots 30 for interfacing the computer system C with various optional capabilities and functions such as modems, audio cards, video controllers and floppy or hard disk controllers. Only two slots 30 are shown although a typical computer system might include more than two. As shown in FIG. 1, one of the I/O slots 30 is connected to a connector 31 of the high speed modem M, which is used to interface the computer system C to an external device (not shown) through a standard telephone line 44. The modem M preferably includes a UART support chip 32 for converting serial data received from the external device by the modem M to parallel data transferred on the I/O bus 28, and for converting parallel data from the computer system C to serial data to be transmitted by the modem M to the external device. The UART 32 is connected to the connector 31 through a parallel interface and a microcontroller 34 through a serial interface each designed for transferring data. Other connections might also be made among the various components, such as parallel interfaces for control and configuration purposes, but these are not shown for purposes of simplicity.

The UART 32 provides a variety of functions to the modem M, including communications to the computer system C, clock controls, configurable registers and power down control for the microcontroller 34. The UART 32 serves as a bus slave to the CPU system 20 for data transfers occurring through the bus controller 26. The UART 32 is typically an application specific integrated circuit (ASIC), but could instead be constructed of discrete components. The microcontroller 34 is typically an embedded controller, and in the preferred embodiment, is a 68302 integrated multiprotocol processor, manufactured by Motorola, Inc. The microcontroller 34 performs error correction procedures on the data received from the external device, where these procedures preferably conform to the V.42 recommendations by CCITT. The microcontroller 34 may also perform data compression/decompression procedures, where these procedures preferably conform to the V.42bis recommendations by CCITT.

The microcontroller 34 preferably communicates with a digital signal processor (DSP) 36, which is typically part of a modem data pump chip set supporting various protocols of modem communication, such as the V.32bis protocol for full duplex operation at up to 14,400 bits per second (bps). The chip set typically includes a coder-decoder (CODEC) 38, which provides analog to digital (A/D) and digital to analog (D/A) conversion for interfacing the DSP 36 to a data access arrangement (DAA) 40.

The DAA 40 is connected to the standard telephone line 44 through a phone jack, such as an RJ11 type phone jack. It is understood that many different kinds of phone lines or other transmission media are contemplated, so that the phone jack 42 and DAA 40 would be configured to be compatible with whatever phone line means or transmission media is being used. The present invention is not limited by any particular type of transmission media, phone jack or DAA, so that those shown are used merely for purposes of illustration.

In general, the DAA 40 serves to isolate the modem M from the telephone line 44 to meet FCC or national regulations for the control of EMI/RFI interference. Qualification procedures are intended to measure this interference to allow only those systems transmitting below a maximum allowable level to be connected to the phone line. The DAA 40 also serves to separate received data from the phone line onto a signal RXA, and to transmit data from a signal TXA to the phone jack 42. The DAA 40 also preferably detects the phone ringing and asserts a digital signal RI*, which is detected by the modem software operating on the computer system C. An asterisk at the end of a signal name denotes negative digital logic, where the signal is considered asserted when low. The computer system C would normally respond to the phone ringing by instructing the microcontroller 34 to answer the phone to begin communications. Data being received by the modem from an external device is filtered and provided in analog form to the CODEC 38 on the RXA signal. Similarly, data being transmitted by the modem M is provided from the CODEC 38 to the DAA 40 on the TXA signal, which is then asserted by the DAA 40 on the phone line. The CODEC 38 digitizes analog data from the RXA signal for processing by the DSP 36, and converts digital data from the DSP 36 to analog format onto the TXA signal. Data is preferably transferred serially between the DSP 36 and the CODEC 38.

The DSP 36 generally modulates data from the computer system C for transmission on the phone line and demodulates data from the phone line to extract the original digital data sent from the external device. The DSP 36 also preferably performs echo cancellation to cancel signals echoed back to the modem M due to the transmitted signal. The microcontroller 34 establishes a communication link between the modem M and the external unit when commanded by the modem software. To establish a communication link, the microcontroller 34 directs the proper sequence of these signals to either originate or answer a telephone call.

Figure 2:
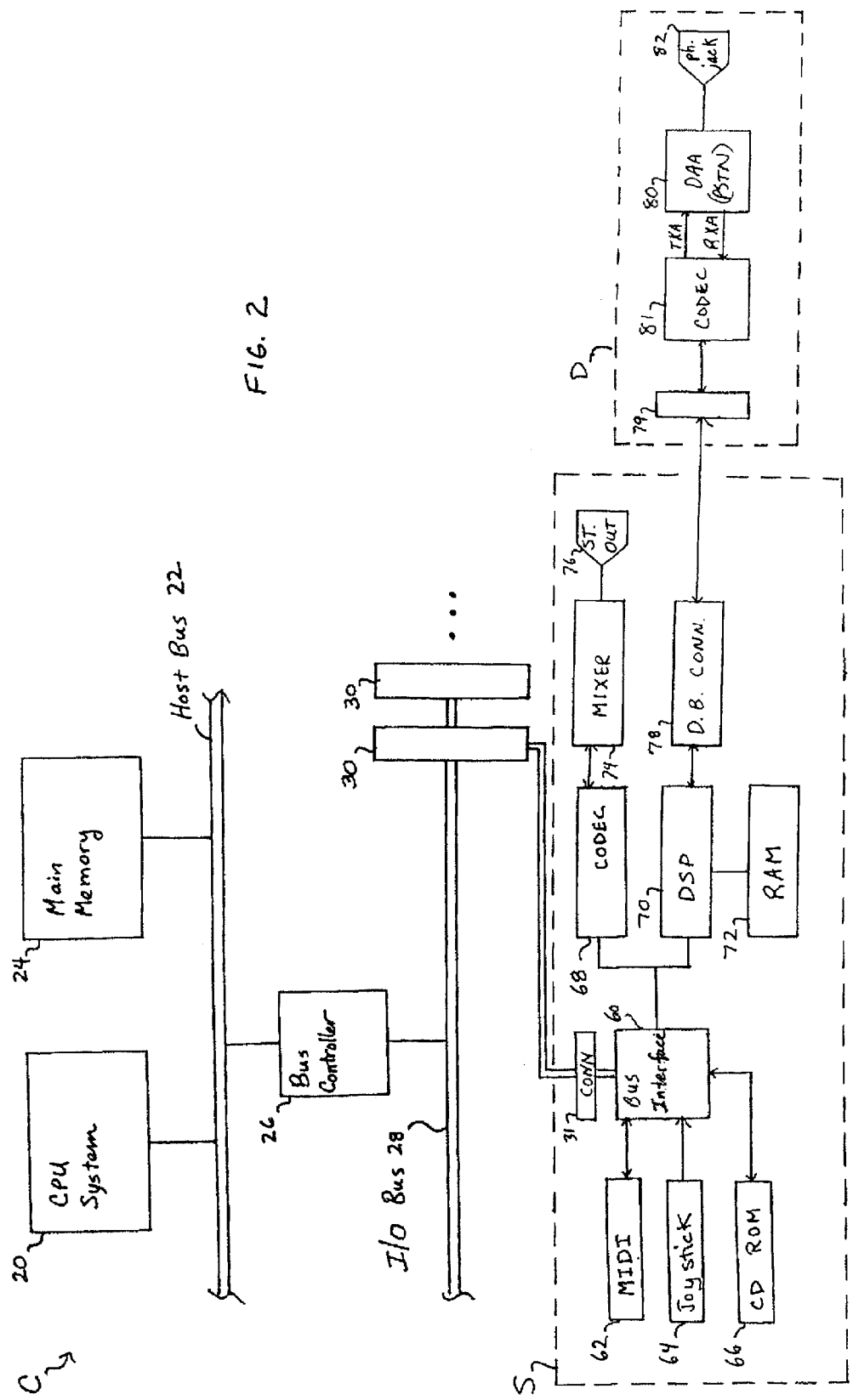
FIG. 2 is a simplified block diagram a computer system according to the present invention including an optional audio sound board card installed in the I/O bus, and a daughter board installed on the sound board card to add modem and fax capabilities.

Referring now to FIG. 2, the computer system C is shown connected to an optional sound board S which is implemented according to the present invention. It is understood that a sound board is used for illustrative purposes only, and that other types of optional cards are contemplated which include a DSP or DSP capabilities. Similar elements as those shown in FIG. 1 assume identical reference numerals. A slave bus interface 60 of the sound board S is coupled to an I/O slot 30 through a connector 31 for interfacing the sound board S to the computer system C. The sound board S is typically coupled to various functions, such as a CD ROM through a CD ROM connector 66, to a joystick through a joystick connector 64 and to music apparatus through an MIDI connection 62. The bus interface 60 is also connected to a CODEC 68 and to a DSP 70, which typically performs frequency modulation synthesis for the functions of the sound board S. The sound board S includes a stereo output connector 76, which is connected through a mixer 74 to the CODEC 68.

In one embodiment, the DSP 70 is the DSP3210 manufactured by AT&T Microelectronics, which includes advanced capabilities including those functions typically performed by the microcontroller 34 in a standard modem. These functions include error correction on data received from the phone line from the external device, data compression and decompression functions as well as the functions involved in establishing and controlling modem communications. In another embodiment, the DSP 70 is the Motorola DSP56002 by Motorola, Inc., although additional interface logic (not shown) is required as known to those skilled in the art. It is noted, however, that the present invention is not limited by any particular DSP, so that a microcontroller similar to the microcontroller 34 could also be included on the sound board S if the DSP 70 is the same as the DSP 36.

A RAM memory 72 is preferably included and coupled to the DSP 70 for storing the various device drivers or software for controlling the functions performed by the sound board S. The RAM 72 is also used to store appropriate software to control the operation of another function or set of functions requiring the use of the DSP 70, although not related to the functions of the sound board S. The other software is preferably downloaded from the computer system C. For example, the second, unrelated functions are preferably associated with modem capabilities, where modem software is downloaded into the RAM 72. Alternatively, the modem software may be incorporated into a read only memory (ROM) device (not shown) installed on the sound board S and coupled to the DSP 70 in place of the RAM 72.

In the preferred embodiment, the sound board S preferably includes a connector 78 coupled to the DSP 70 for receiving a daughter board D upgrading the computer system C to include modem and fax capabilities. In particular, the daughter board D includes a compatible connector 79 for coupling to the daughter board connector 78, a CODEC 81 coupled to the connector 79 and a PSTN interface DAA 80 coupled to the CODEC 81. The daughter board D also includes a phone jack 82 coupled to the DAA 80, where the phone jack 82 is similar to the phone jack 42. Data received from an external device through the phone jack 82 is converted by the DAA 80 to the appropriate analog data and provided to the CODEC 81. The CODEC 81 converts the analog data to the appropriate digital format and provides this data to the DSP 70. The DSP 70 processes the data and transfers the data to the computer system C through the bus interface 60. The bus interface 60 acts as a slave to the CPU system 20 and converts the serial data from the DSP 70 to the proper parallel format for transfer to the main memory 24, and vice versa. As described previously, this procedure is generally reversed for data transmitted by the computer system C to an external device.

It can therefore be appreciated that the sound board S equipped with the modem daughter board D performs all audio and modem functions using the single DSP 70 mounted on the sound board S. Thus, a single DSP is used to perform the operations of two unrelated functions. Those requiring only audio functions may purchase the sound board S alone and not be subject to wait for foreign qualification procedures. Those requiring modem and fax functions may upgrade the sound board S with the relatively inexpensive daughter board D, which allows full modem and fax capabilities to be added. Another DSP is not required. As the daughter board D is the only portion requiring foreign qualification procedures, changes to the sound board S can be made more easily and previously qualified daughter boards D may be used.

Referring now to FIG. 3, a computer system C' is shown, which is implemented according to an alternative embodiment of the present invention. Similar components again assume identical reference numerals. The computer system C' preferably includes the CPU system 20, the main memory 24 connected to the host bus 22 and the I/O bus 28 coupled through the bus controller 26. Additionally, a DSP 100 is connected to the host bus 22 to perform various functions required by the computer system C'. In this case, the DSP 100 is located centrally for access by the CPU system 20 and also by I/O options installed on the I/O bus 28 through the bus controller 26. Alternatively, the DSP 100 is coupled to the I/O bus 28, which is shown as DSP 100'. Operation of the DSP 100' will not be described in detail since it is very similar to the operation of the DSP 100, except that the DSP 100' indirectly accesses the host bus 22 rather than directly, as known to those skilled in computer design. In particular, the CPU system 20 accesses the DSP 100' by executing a cycle to the I/O bus 28 through the bus controller 26, and the DSP 100' accesses the CPU system 20 and the main memory 24 in a similar manner. Otherwise, operation is the same. Thus, the bus controller 26, as well as other known and common system components not shown, allow ready access between the host and I/O buses 22 and 28. It is noted that only one DSP, the DSP 100, or the DSP 100', would be required in a given computer system.

Again, the DSP 100 is preferably the DSP3210 by AT&T Microelectronics, which incorporates capabilities typically performed by the microcontroller 34 in a standard modem as well as the capabilities for the audio functions, which may typically be found on a sound board. Alternatively, the DSP 100 is the Motorola DSP56002. As before, the modem functions include error correction on data received from the phone line from the external device, data compression and decompression functions as well as the functions involved in establishing and controlling modem communications. The DSP3210 can perform these functions, thereby freeing up the CPU system 20 to perform other tasks necessary for the computer system C'. Alternatively, the modem functions could be performed by the CPU system 20 since the data is conveniently accessible in the main memory 24.

The computer system C' is shown connected to a card M', which is preferably a partial modem card similar to the partial modem daughter board D. The card M' is preferably an option card including a connector 31 for coupling to one of the I/O slots 30 of the I/O bus 28. The card M' is added to upgrade the computer system C' to include modem and fax capabilities using the DSP 100. The I/O bus 28 is thus coupled to a CODEC interface (I/F) 102, which performs similar functions as the CODECs 38 and 81, but which also includes appropriate support logic for asserting its digitized analog data on the I/O bus 28. The additional support logic preferably includes serial/parallel conversion and bus slave or master logic.

The card M' includes a DAA 104 coupled to the CODEC I/F 102, where the DAA 104 is also coupled to a phone jack 106. The phone jack 106 is similar to the phone jacks 42 or 82. Appropriate software is loaded into the main memory 24 to control modem and fax functions and data transfers between the card M' and the main memory 24. In this manner, data received from the phone lines is transferred through the phone jack 106 to the DAA 104 and converted to appropriate analog format on the RXA signal to the CODEC I/F 102. The CODEC I/F 102 transmits the data to main memory 24 as controlled by the CPU system 20 executing the modem software. It is noted that the CODEC I/F 102 transfers digitized analog data on the I/O bus 28 rather than the actual digital data, since the CODEC functions are separated from the DSP functions across the I/O bus 28. The CPU system 20, as controlled by the modem software, informs the DSP 100 that data has been received from the card M', and the DSP 100 then processes the received data to the digital data usable by the computer system C'. In particular, the DSP 100 retrieves the received data from the main memory 24, processes the data, and then stores the processed data back into the main memory 24. The CPU 20 may retrieve the data processed by the DSP 100 for further processing.

In a similar manner, data is placed into the memory 24 by the CPU 20 for transmission to an external device. The DSP 100 retrieves the data, processes or modulates the data to the appropriate form for transmission and places the modulated data back into the main memory 24. Then, the modulated data is transferred through the I/O bus 28 to the CODEC I/F 102, typically by the CPU 20 as controlled by modem software. This data is transmitted on the TXA signal to the DAA 104, which is then transmitted on to the phone lines through the phone jack 106 to the external device. In this manner, the main memory 24 preferably provides the memory and storage for the modem software, the received or transmitted digitized analog data and the converted to actual digital data by the DSP 100. Also, raw or modulated data is typically transferred between the main memory 24 and the card M' across the host and I/O busses 22, 28.

The central location of the DSP 100 allows convenient access by any logic in the computer system C' or coupled to the computer system C' through the I/O bus 28. In the embodiment shown in FIG. 3, the computer system C' is upgraded to include modem and fax capabilities by purchasing a relatively inexpensive card M'. Again, a duplicate DSP need not be purchased.

It can now be appreciated that a computer system implemented according to the present embodiment includes a DSP processor to perform certain functions, such as those functions needed by audio applications, but which is also used by an optional modem board to upgrade the computer system to include modem and fax capabilities. In this manner, a single DSP chip is used rather than multiple DSPs. Furthermore, a user in a foreign country not requiring modem functions would not be subject to the qualification process, since the modem devices for interfacing to the phone lines are provided on the separate, optional modem cards.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An apparatus for providing audio and modem and fax processing capabilities to a computer system having an I/O bus, the modem and fax capabilities used with a telecommunications link, said apparatus comprising:

an option card, comprising:

means for interfacing with said I/O bus for transferring data;

a digital signal processor on said option card coupled to said interfacing means for performing a plurality of audio processing functions for the computer system;

a daughter board connector connected to said digital signal processor; and a daughter board connectable to the telecommunications link and removably connected through said daughter board connector to said digital signal processor on said option card, said daughter board having circuitry which when combined with said digital signal processor loaded with modem and fax software adds modem and fax functions to said computer system.

2. The apparatus of claim 1, wherein said computer system includes memory for storing modem software used for controlling said digital signal processor on said option card.

3. The apparatus of claim 1, wherein said daughter board comprises a coder-decoder coupled to said digital signal processor when said daughter board is connected to said option card;

a data access arrangement coupled to said coder-decoder; and a phone jack coupled to said data access arrangement for connecting to said telecommunications link, wherein said digital signal processor on said option card interfaces with said data access arrangement through said coder-decoder.

4. The apparatus of claim 1, wherein said computer system includes a host bus and a bus controller coupled between said host and I/O buses for interfacing said host bus to the I/O bus, said interfacing means further comprising:

a bus interface operating as a slave to the computer system bus controller for transferring data between said option card and the computer system host bus; and a universal asynchronous receiver/transmitter coupled to said bus interface and for coupling to the I/O bus.

5. The apparatus of claim 1, wherein said digital signal processor on said option card includes means for performing error correction on data received from said daughter board, and further includes means for performing data compression and decompression.

6. A computer system, comprising:

a host bus;

a digital signal processor coupled to said host bus, said digital signal processor including means for performing audio signal processing functions for said computer system, the digital signal processor being loaded with modem and fax software;

an I/O bus including I/O slots for receiving option cards;

means coupled between said host bus and said I/O bus for controlling data transfer between said host and I/O buses; and an option card coupled to said I/O bus, said option card including means for performing data modem and facsimile operations, said data modem and facsimile operations means communicating with said digital signal processor through said data transfer means for conditioning modem and facsimile data received by said option card.

7. The computer system of claim 6, further comprising:

a CPU coupled to said host bus;

memory coupled to said host bus and loaded with modem software for execution by said CPU; and wherein said CPU controls data transfer using said data transfer controlling means and indicates to said digital signal processor when said memory contains data received from said option card.

8. The computer system of claim 6, wherein said option card comprises a coder-decoder interface device;

a data access arrangement coupled to said coder-decoder interface device; and a phone jack coupled to said data access arrangement.

9. The computer system of claim 8, wherein said coder-decoder interface device includes bus slave logic for transferring data between said option card and said host bus as controlled by said data transfer controlling means.

10. The computer system of claim 6, wherein said digital signal processor includes means for performing error correction on data received from said option card, and further includes means for performing data compression and decompression.

11. A computer system, comprising:

a host bus;

an I/O bus including I/O slots for receiving option cards;

a digital signal processor coupled to said I/O bus, said digital signal processor including means for performing audio signal processing functions for said computer system, the digital signal processor being loaded with modem and fax software;

means coupled between said host bus and said I/O bus for controlling data transfer between and for allowing access of said host and I/O buses; and an option card coupled to said I/O bus, said option card including means for performing data modem and facsimile operations, said data modem and facsimile operations means communicating with said digital signal processor through said data transfer means for conditioning modem and facsimile data received by said option card.

12. The computer system of claim 11, further comprising:

a CPU coupled to said host bus;

memory coupled to said host bus and loaded with modem software for execution by said CPU; and wherein said CPU controls data transfer using said data transfer controlling means and indicates to said digital signal processor when said memory contains data received from said option card.

13. The computer system of claim 11, wherein said option card comprises a coder-decoder interface device;

a data access arrangement coupled to said coder-decoder interface device; and a phone jack coupled to said data access arrangement.

14. The computer system of claim 13, wherein said coder-decoder interface device includes bus slave logic for transferring data between said option card and said host bus as controlled by said data transfer controlling means.

15. The computer system of claim 11, wherein said digital signal processor includes means for performing error correction on data received from said option card, and further includes means for performing data compression and decompression.

16. A computer system adapted for audio capability and modem and fax capability, the system comprising:
- a sound card, comprising:
  - a digital signal processor;
  - a memory coupled to the digital signal processor storing modem and fax software and sound card software; and
- a modem board coupled to the sound card, the modem board comprising:
  - a coder/decoder coupled to the digital signal processor; and
  - a data access arrangement coupled to the coder/decoder,
- wherein the digital signal processor both provides modem and fax capability in connection with the modem board and the modem and fax software and provides audio capability in connection with the sound card software.

17. A computer system adapted for audio capability and modem and fax capability, the system comprising:
- a digital signal processor;
- a memory coupled to digital signal processor storing modem and fax software and sound card software;
- a first coder/decoder coupled to the digital signal processor;
- a mixer coupled to the first coder/decoder; and
- a modem board coupled to the digital signal processor, the modem board comprising:
  - a second coder/decoder coupled to the digital signal processor; and
  - a data access arrangement coupled to the second coder/decoder,
- wherein the digital signal processor both provides modem and fax capability in connection with the modem board and the modem and fax software and provides audio capability in connection with the sound card software.

18. A computer system adapted for audio capability and modem and fax capability, the system comprising:
- a host bus;
- a central processor coupled to a host bus;
- a digital signal processor coupled to the host bus;
- a main memory coupled to the host bus and storing modem and fax software and sound card software; and
- a modem card coupled to the digital signal processor, the modem card comprising:
  - a coder/decoder coupled to the digital signal processor; and
  - a data access arrangement coupled to the coder/decoder,
- wherein the digital signal processor both provides modem and fax capability in connection with the modem card and the modem and fax software and provides audio capability in connection with the sound card software.

* * * * *